No. 798,378. PATENTED AUG. 29, 1905.
E. WYATT.
STOCK CAR.
APPLICATION FILED MAR. 17, 1905.
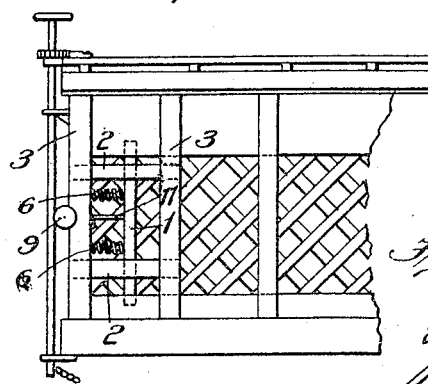
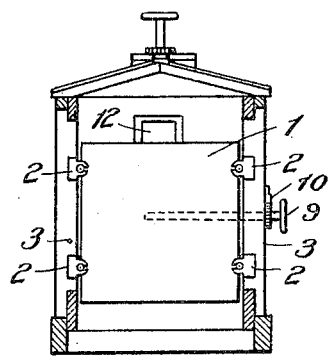
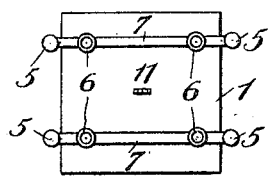
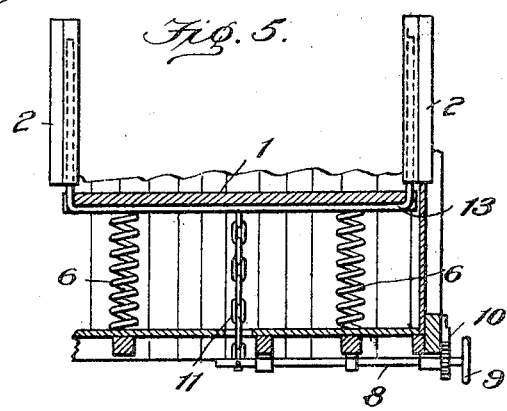
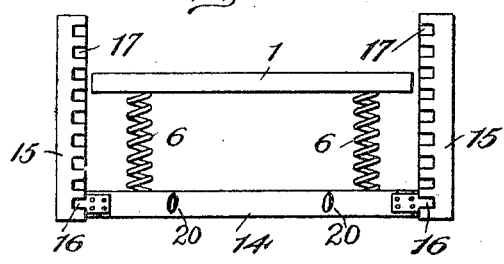
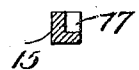
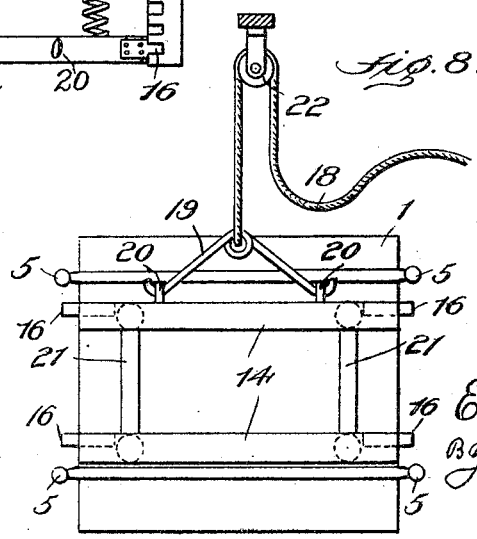
Witnesses
F. J. Snigleton
J. W. Stitt
Inventor
Everett Wyatt,
By A. L. Jackson,
Attorney.

UNITED STATES PATENT OFFICE.

EVERETT WYATT, OF FORT WORTH, TEXAS.

STOCK-CAR.

No. 798,378.     Specification of Letters Patent.     Patented Aug. 29, 1905.

Application filed March 17, 1905. Serial No. 250,599.

*To all whom it may concern:*

Be it known that I, EVERETT WYATT, a citizen of the United States, residing at Fort Worth, Texas, have invented certain new and useful Improvements in Stock-Cars, of which the following is a specification.

This invention relates to stock-cars, and more particularly to safety devices; and the object is to provide devices for preventing the crushing of cattle against the ends of the cars. Observation shows that cattle try to get away from the ends of the cars, and a space of one foot or two feet can be seen between the end and the first animal at each end of the car. Stock do this because of being knocked against the ends of the car. When a whole car-load of cattle are thrown toward the end of the car, the animal next to the end gets a terrible pressure on it, knocking it against the end of the car with a tremendous force. Cattle are often knocked down in this manner, and often the only way to get the animal up is to unload or partly unload the car, and very often the animal that is down is killed. I have provided means for preventing the animal next to the end from receiving such hard knocks and pressure, and same means make it practical to help up an animal without disturbing the other animals in the car.

Other objects and advantages will be fully explained in the following description, and the invention will be more particularly pointed out in the claims.

Reference is had to the accompanying drawings, which form a part of this application and specification.

Figure 1 shows a broken view of a car with the improvements attached, the front boards being left off so that the safety end piece and springs may be seen. Fig. 2 is a cross-section of a car, showing the safety end piece and the tracks for guiding the end piece. Fig. 3 is a detail view of one of the tracks, showing manner of mounting the end piece. Fig. 4 is an elevation of the safety end piece, showing the disposition of the springs and the guiding-lugs. Fig. 5 is a broken sectional plan view showing a variation in the manner of mounting the safety end piece. Fig. 6 is a detail plan view showing a variation in the manner of mounting the springs of the safety end piece. Fig. 7 is a cross-section of one of the racks for locating the cross piece or bar for mounting the springs shown in Fig. 6. Fig. 8 is an elevation of the devices shown in Fig. 6, showing a lever attached.

Similar characters of reference are used to indicate the same parts throughout the several views.

The improvement herein described is applicable to any stock-car of ordinary construction and can be readily attached to cars in use.

The safety end piece consists of a buffer 1, which is mounted on tracks 2, attached to the side posts 3 of the car, and these tracks may be countersunk in the posts 3. The tracks 2 have grooves 4 therein to receive the guide-lugs 5, which are attached to the buffer 1. The lugs 5 may be spherical and slidable in the grooves 4, so that the buffer 1 will have reciprocal motion from and toward the end of the car. Spiral springs 6 of suitable length and of suitable strength are attached to the buffer 1 and to the end of the car in any suitable manner. The spiral springs hold the buffer 1 normally at a short distance from the end of the car, but permit a yielding motion of the buffer toward the end of the car when pressure comes against the buffer. The lugs 5 may be attached to the buffer 1 in any suitable manner. Fig. 4 shows the lugs formed on the ends of bars 7, which may be attached to the buffer. Fig. 3 shows the lugs 5 formed on the end of a bolt which is inserted in the buffer. Means are provided for drawing the buffer 1 against the end of the car. A windlass of usual construction, consisting of the rod 8, hand-wheel 9, and ratchet and dog 10, is mounted on the end of the car, and a chain 11 is attached to the buffer and to the rod or shaft 8. By winding the chain 11 on the rod 8 the buffer 1 may be drawn practically against the end of the car. This may be done whenever an animal is down, so that space may be had for getting the animal on its feet. The buffer 1 may be two feet or more or less from the bottom of the car, so that an animal may be protected under the buffer while down. The buffer need not extend high enough to be in the way of passage through the small door 12 usually placed in such cars.

The variation shown in Fig. 5 consists of the means for mounting the buffer in the tracks 2. The means for accomplishing this may be U-shaped bars 13, with the arms engaging the tracks 2 in the same manner as the lugs 5 engage these tracks. If such bars are used, the slots 4 might be dispensed with and the arms of the bars 13 would have longitudinal movement in the tracks.

Instead of attaching the springs 6 to the end of the car these springs may be attached to bars 14 and provision made for locating these bars 14 at different points in the car. For this purpose racks 15 may be attached to the posts 3 in the same manner that the tracks 2 are attached to these posts. The bars 14 could then be set at any distance desirable from the end of the car. The racks 15 may be made in the manner illustrated and the bars 14 provided with lugs 16 to engage the racks 15. These lugs may be placed in any pair of the recesses 17 which are between the teeth of the racks. The same tracks 2 may be used for the buffer 1. Means are provided for elevating the bars 14, so that the lugs 16 may be set in other pairs of recesses 17 of the racks 15. A bail 19 may be secured to the upper bar 14 by catches 20, which may be staples driven into the bar or otherwise secured therein. A cord or cable 18 may be run over a pulley 22 and then attached to the bail 19. The cord or cable 18 can then be extended to the outside of the car for convenience. A pull on the cable 18 will raise the bars 14 for the purpose of setting the buffer at different positions. When the bars 14 have been raised, these bars may be shoved to the desirable position by hand or otherwise. The bars 14 may be made rigid with each other by bars or rods 21.

Various changes may be made in constructing and arranging the buffer without departing from my invention. The buffer might be called a "false end." The buffer will not occupy more space than is usually left in the car by the animals pressing away from the end to prevent being knocked against the end of the car, because the animals will soon learn that the buffer will not hurt them.

Having fully described my invention, what I claim as new, and desire to secure by Letters Patent, is—

1. A spring-buffer for stock-cars and means for holding said buffer in place at different adjustments near the end of the car.

2. A spring-buffer for stock-cars mounted inside of the car-body and near the end of the car and tracks for guiding said buffer in motion toward or from the end of the car.

3. A yielding buffer for stock-cars mounted inside of the car-body and near the end of the car, tracks for said buffer, and guiding-lugs carried by said buffer and engaging said tracks.

4. A spring-buffer for stock-cars mounted near the end of the car, tracks having grooves therein countersunk in the posts of the car, and guiding-lugs carried by said buffer and engaging said tracks.

5. A yielding buffer for stock-cars mounted near the end of the car and means for pressing the buffer toward the end of the car.

6. A spring-buffer for stock-cars held normally near the end of the car and a chain and a windlass for forcing said buffer toward the end of the car.

7. A spring-buffer for stock-cars and means for receiving and holding said buffer at different positions in the car.

8. A spring-buffer for stock-cars, a frame for setting said buffer at different positions in the car, and means for carrying and holding said frame at stationary positions in the car.

9. A spring-buffer for stock-cars, a frame for carrying and holding said buffer at different positions, racks for said frame, and lugs carried by said frame adapted to engage said racks.

10. A spring-buffer for stock-cars, a frame for setting said buffer at different positions in the car, racks for said frame, lugs carried by said frame adapted to engage said racks, and means for elevating said frame to set the same at different positions.

11. A buffer for stock-cars, a frame for holding said buffer at different positions in the car, guiding-tracks for said buffer, racks for said frame, and means for elevating said frame to set the same at different positions on said racks.

In testimony whereof I set my hand, in the presence of two witnesses, this 8th day of March, 1905.

EVERETT WYATT.

Witnesses:
 A. L. JACKSON,
 EDWIN E. WYATT.